(12) United States Patent
Kurupati et al.

(10) Patent No.: US 7,515,766 B2
(45) Date of Patent: Apr. 7, 2009

(54) APPARATUS AND METHOD FOR EDGE HANDLING IN IMAGE PROCESSING

(75) Inventors: Sreenath Kurupati, Santa Clara, CA (US); Brian R. Nickerson, Hillsboro, OR (US); Samuel Wong, Richmond Hill (CA); Sunil Chaudhari, Milpitas, CA (US); Jonathan W. Liu, Campbell, CA (US)

(73) Assignee: Intel Corporation, Santa Clara, CA (US)

( * ) Notice: Subject to any disclaimer, the term of this patent is extended or adjusted under 35 U.S.C. 154(b) by 746 days.

(21) Appl. No.: 10/947,852

(22) Filed: Sep. 22, 2004

(65) Prior Publication Data

US 2006/0061582 A1 Mar. 23, 2006

(51) Int. Cl.
*G06K 9/40* (2006.01)
*G09G 5/36* (2006.01)

(52) U.S. Cl. ........................................ 382/268; 345/559
(58) Field of Classification Search ................. 382/266, 382/268, 269, 295, 298, 299, 300, 305; 358/1.17, 358/1.2, 3.15; 345/472, 530, 559
See application file for complete search history.

(56) References Cited

U.S. PATENT DOCUMENTS 5,237,432 A * 8/1993 Calarco et al. .............. 358/451
5,528,704 A * 6/1996 Parker et al. ................ 382/299
5,650,858 A * 7/1997 Lund .......................... 358/3.15
5,689,343 A * 11/1997 Loce et al. .................. 358/3.21
6,005,580 A * 12/1999 Donovan ..................... 345/428
6,144,700 A * 11/2000 Kim ........................ 375/240.03
6,549,674 B1   4/2003 Chui et al.
6,664,955 B1  12/2003 Deering

FOREIGN PATENT DOCUMENTS

WO    WO 99/18727    4/1999

* cited by examiner

*Primary Examiner*—Kanji Patel
(74) *Attorney, Agent, or Firm*—Blakely, Sokoloff, Taylor & Zafman LLP

(57) ABSTRACT

A method and apparatus for hardware-base edge handling in video post-processing. In one embodiment, the method includes the identification of at least one unstored input pixel required to compute an output pixel during output pixel computation. Once identified, a pixel value is generated for the at least one unstored input pixel according to a detected edge handling mode. The generation of the pixel value for the unstored input pixel is performed, in one embodiment, if a position of the unstored input pixel is outside a pixel frame boundary. For example, in one embodiment, for output pixel computation of a scaling operation, the frame boundaries include a left (top) edge and a right (bottom) edge for which input pixels required to compute output pixels at or near the frame boundaries do not exist. Other embodiments are described and claimed.

31 Claims, 6 Drawing Sheets

APPARATUS AND METHOD FOR EDGE HANDLING IN IMAGE PROCESSING

BACKGROUND

One or more embodiments relate to the fields of video post-processing and image enhancement. More particularly, one embodiment relates to a method and apparatus for edge handling in image processing.

Current digital televisions (DTV) may provide video post-processing and/or image enhancement in a display processing pipeline of the DTV following decoding of an encoded media signal but prior to display of the decoded digital video frames. Examples of video post-processing include horizontal and vertical video scaling. Horizontal and vertical video scaling in DTV chips may be implemented using a polyphase filter. Generally, video scaling can be viewed as an interpolation/decimation process, which involves producing a larger/smaller (depending on the scaling factor) number of output pixels from a set of input pixels. When scaling is implemented using a polyphase filter, each output pixel produced is a function of N, input pixels.

Generally, N is an integer referring to a number of taps provided by the polyphase filter to perform the scaling process. The N, input pixels required to produce an output pixel are generally centered on a position of the output pixel, for example, when using a symmetric polyphase filter. While this works for most of the output pixels, it poses a problem at the edges of a pixel frame. In fact, at least one of the input pixels required to produce an output pixel at a pixel frame boundary does not exist.

As an example, consider scaling (upscaling) from 720 horizontal pixels to 1920 pixels. Assume the number of taps or N in this example is equal to nine. Based on this number of taps, to produce output pixel zero (pixels being numbered 0-1919), nine input pixels are needed, centered around zero. While input pixels 0-4 are present, pixels −4 to −1 do not exist. Likewise, output pixel computation for output pixels 1, 2 and 3 will also have missing input pixels. Although the number of missing pixels reduces and ultimately disappears as subsequent output pixels are computed, the problem reoccurs at the right edge of the pixel frame (top and bottom edge (for vertical scaling)), namely, input pixels to the right of input pixel 719 (for a 720 line width pixel frame) also do not exist.

To handle this problem, several edge handling methods currently exist. These methods involve padding extra edge pixels around the pixel frame. The methods include replication (in the above example, pixels −4 to −1 all take the value of pixel 0); mirroring, wherein pixels −4 to −1 take the values of pixels 1-4; and zero-based, where pixels −4 to −1 are simply set to zero.

Implementation of any one of the above methods typically involves the actual creation of these padded pixels by software or other hardware units and storing them in memory prior to performance of the scaling operation. As a result, the video scaler reads the complete padded image. Often times hardware vendors ignore the edge handling problem altogether and compromise the quality of scaling at pixel frame edges.

BRIEF DESCRIPTION OF THE DRAWINGS

The various embodiments of the present invention are illustrated by way of example, and not by way of limitation, in the figures of the accompanying drawings and in which.

DETAILED DESCRIPTION

In the following description, numerous specific details such as logic implementations, sizes and names of signals and buses, types and interrelationships of system components, and logic partitioning/integration choices are set forth in order to provide a more thorough understanding. It will be appreciated, however, by one skilled in the art that the invention may be practiced without such specific details. In other instances, control structures and gate level circuits have not been shown in detail to avoid obscuring the invention. Those of ordinary skill in the art, with the included descriptions, will be able to implement appropriate logic circuits without undue experimentation.

System

Figure 1:
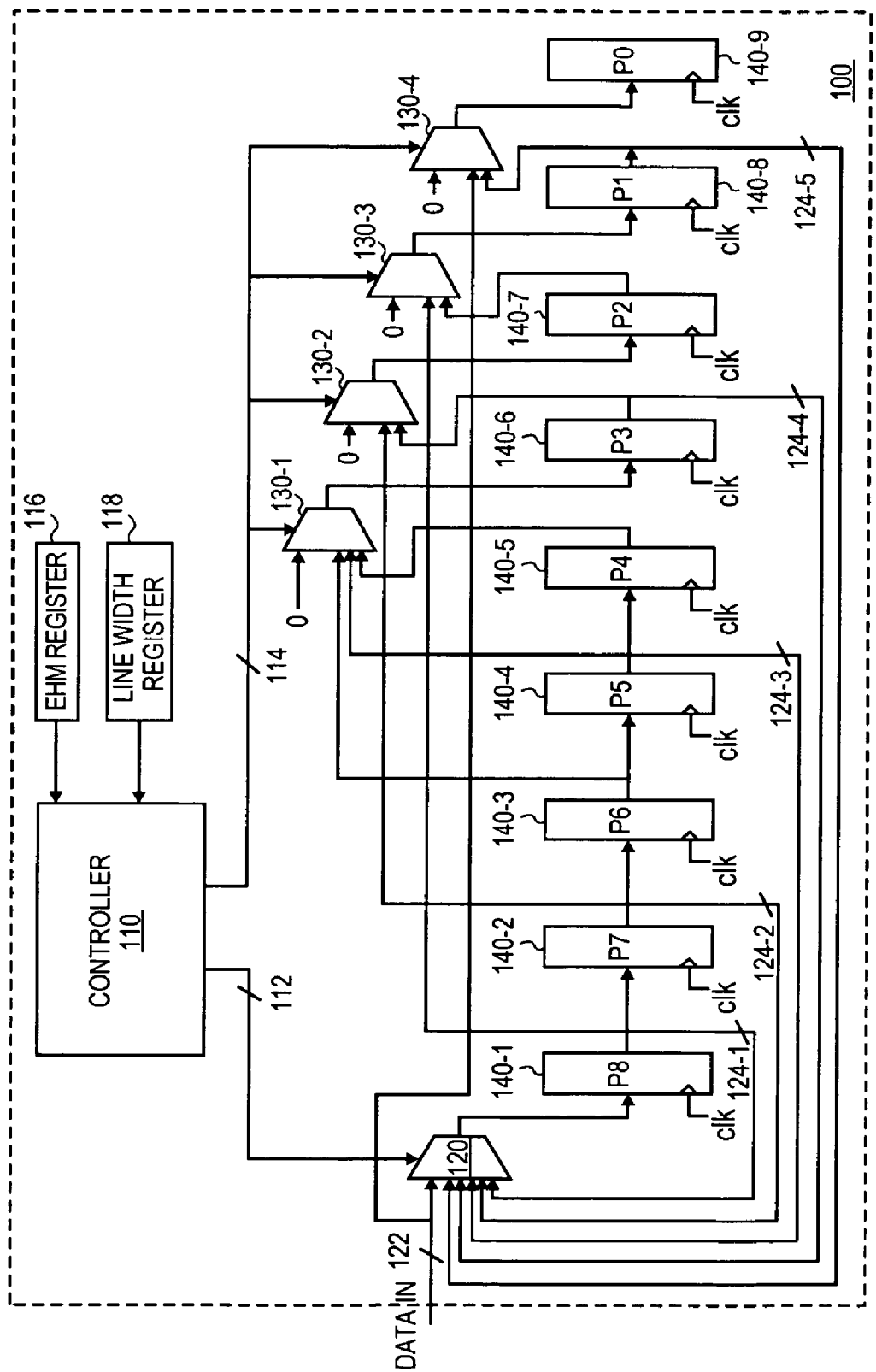
FIG. 1 is a block diagram illustrating edge handling logic, in accordance with one embodiment.

FIG. 1 is a block diagram illustrating edge handling logic 100, in accordance with one embodiment. In one embodiment, edge handling logic 100 performs edge handling during image processing such as video post-processing and/or image enhancement. In one embodiment, edge handling logic 100 is incorporated within horizontal and vertical scalers of video post-processing logic, such as, for example, a display cluster. The embodiments described herein are not limited to incorporation of edge handling logic within horizontal and video scalers and can be used in other types of post-processing logic. Examples include the use in a display processing pipeline of a digital television (DTV), a display engine of a system chipset having an integrated graphics controller within a computer system or other display device.

Representatively, edge handling logic 100 includes controller 110, which may be programmed or hardwired to direct input logic gate 120, as well as second logic gates 130 (130-1, 130-2, 130-3 and, 130-4) to populate input pixel registers 140 (140-1, 140-2, 140-3, 140-4, 140-5, 140-6, 140-7, 140-8 and, 140-9). As illustrated with reference to FIG. 1, edge handling logic 100 operates within a horizontal/vertical scaler of video post-processing logic. However, the embodiments described herein are not limited to edge handling logic 100 implemented within vertical or horizontal scalers and can be applied to other video post-processing and image handling techniques that process pixel frames to generate output pixels from input pixels that are outside pixel frame boundaries, for example, as shown in FIG. 2.

Figure 2:
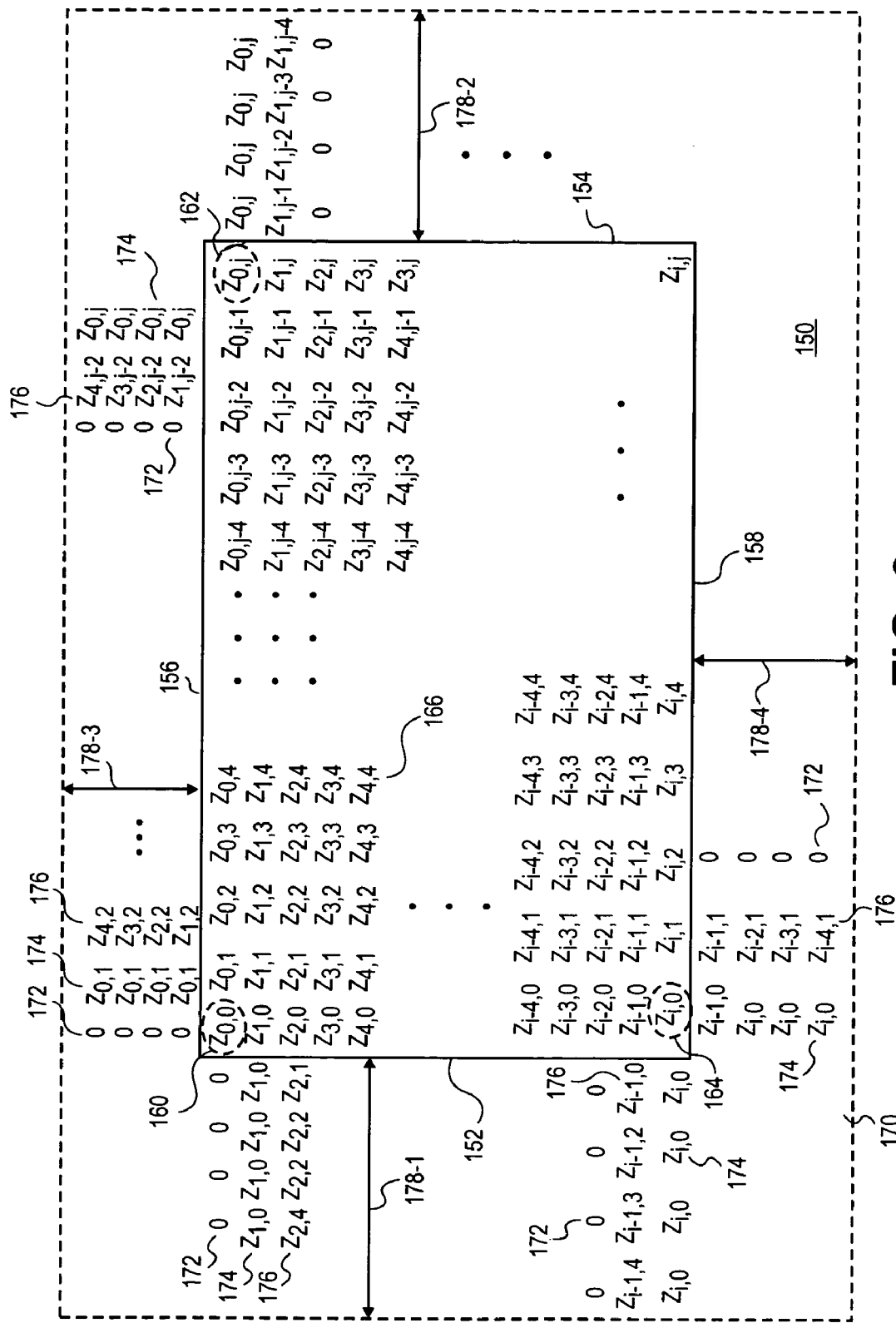
FIG. 2 is a block diagram illustrating edge handling at pixel frame boundaries, in accordance with one embodiment.

FIG. 2 is a block diagram illustrating a pixel frame buffer 150 including a plurality of input pixels 166 ($Z_{0,0}$ ..., $Z_{i,j}$). As illustrated, pixel frame buffer 150 includes left edge 152, right edge 154, top edge 156 and bottom edge 158. Accordingly, in one embodiment, where edge handling logic (EHL) 100 (FIG. 1) is used to perform scaling within a DTV processing pipeline, EHL 100 may be implemented within a horizontal scaler of a video post-processing logic.

As described above, video scaling in DTV chips is generally implemented using a polyphase filter. Video scaling can be viewed as an interpolation/decimation process, which involves producing a larger/smaller (depending on the scaling factor) number of output pixels from a set of input pixels. When scaling is implemented using a polyphase filter, each output pixel is produced as a function of N, input pixels, where N is a number of taps of the polyphase filter. The N, input pixels used are centered on the same position as the output pixel, for example, as illustrated with reference to FIG. 2.

Assuming output pixel 160 corresponding to a position of input pixel $Z_{0,0}$ is generated from pixel frame 150, input pixels required to compute output pixel 160 may not be available. As illustrated in FIG. 2, assuming a value of N is equal to nine, to generate output pixel 160, nine input pixels centered around output pixel 160 are required. Although nine input pixels are required, only five input pixels are available, specifically, pixels $-Z_{0,4}, -Z_{0,3}, -Z_{0,2}, -Z_{0,1}$ are unavailable since output pixel 160 is at a left edge of pixel frame 150. This problem occurs for output pixel computation of output pixel 162, which is at a right edge of pixel frame 150, and output pixel 164 at a bottom edge 158 of pixel frame 150.

To compute output pixels at or near a pixel frame edge, three edge handling methods exist. Each of these methods involve padding extra edge pixels around outer edge 170 of pixel frame 150. Dimensions (D) 178 (178-1, 178-2, 178-3 and 178-4) of outer edge 170 are determined according to:

$$D=(N-1)/2 \text{ if } N \text{ is odd} \qquad (1)$$

$$D=N/2 \text{ if } N \text{ is even} \qquad (2)$$

To compute output pixel 160, a zero-based edge handling method would pad outer edge 170 of pixel frame buffer 150 with the zero values 172. By padding outer edge 170 of pixel frame 150, the nine input pixels required to compute output pixel 160 are available. As will also be recognized, horizontal scaling for output pixels to the right of output pixel 160 ($Z_{0,1}$, $Z_{0,2}$, $Z_{0,3}$) also require an edge handling method to provide missing input pixels. Other techniques involve replication, where values of the pixel at the frame edge are repeated, as illustrated by 174. In a mirroring method, the values of input pixels are mirrored, as illustrated by 176.

Referring again to FIG. 1, in the embodiment illustrated, edge handling logic 100 is provided for a nine tap polyphase filter. In one embodiment, input pixel registers 140 hold nine input pixels corresponding to the number of taps, N, of the polyphase filter. In one embodiment, each pixel is a 8/10/12 bit quantity corresponding to a luminance value (Y) and chromiance values (Cr/Cb). As illustrated, controller 110 includes edge handling mode (EHM) register 116, to provide the edge handling mode. Likewise, controller 110 is coupled to line width register 118, which provides a line width of a current line of the pixel frame. In one embodiment, EHA register 116 and line width register 118 are populated by, for example, control software, such as a device driver or other like privileged software to provide the edge handling mode and line width of the current line of the pixel frame.

In one embodiment, signal 114 is a left (top) edge control signal provided to second logic gates 130. In one embodiment, signal 112 is a right (bottom) edge control signal, which is provided to first logic gate 120. Based on the line width and depending on the detected edge handling method, in one embodiment being performed, controller 110 determines whether a current output pixel is at our near a pixel frame boundary. In one embodiment, controller 110 asserts control signals 112 and 114 to direct the storage of input pixels with input pixel registers 140 to enable computation of an output pixel according to a video post-processing and/or image enhancement operation.

In one embodiment, first logic gate 120 is, for example, a multiplexer (MUX) that receives an input pixel data signal (data-in) 122, as well as feedback signals 124 (124-1, 124-2, 124-3, 124-4, 124-5) from input pixel registers 140-1, 140-2, 140-3, 140-6 and 140-8 to facilitate handling of a right edge of a pixel frame. Under normal operating conditions, controller 110 directs MUX 120 to populate input pixel register 140-1 with an input pixel from data_in 122. For the remaining pixels in a line, MUX 120 simply selects data_in 122, which is stored within input register 140-1 once values within the various input pixel registers 140 are shifted, for example, right-shifted. When a right edge is detected, controller 110 selects one of the feedback inputs 124 to MUX 120, depending on the detected edge handling mode from register 116.

In one embodiment, second logic gates 130 are also multiplexers (MUX), which are controlled by signal 114, which is driven by controller 110. As illustrated, second MUXes 130 are used to select data from registers 140-6 to 140-9. As illustrated, MUX 130-4 takes input zero for zero-based edge handling, as well as inputs from data_in 122, input pixel register 140-4 and input register 140-8. Likewise, MUX 130-3 takes input zero, as well as inputs from input pixel register 140-1, 140-4 and 140-7. MUX 130-2 takes input zero as well as inputs from input pixel registers 140-2, 140-4 and 140-6. Finally, MUX 130-1 takes inputs from zero and from input pixel registers 140-3, 140-4 and 140-5.

In one embodiment, second MUXes 130 are provided to handle output pixel computation at a left (top) edge. For the remaining pixels in the line, second MUXes operate as simple shift registers. As illustrated, the operation provided is a right shift operation. At the left edge of the line, controller 110 asserts control signal 114 to direct the loading of input pixel registers 140-6, 140-7, 140-8 and 140-9 according to the detected edge handling mode from EHA register 116. In one embodiment, operation of edge handling logic 100 as illustrated in FIG. 1, is performed according to the pseudo-code provided in Table 1.

TABLE 1

```
// Pseudocode parameters: 9 tap polyphase filter
Always @ (every clk edge) begin
    // left edge special code
    // this code kicks in for 1 cycle only on the 5th input pixel.
    // Registers P[0] to P[3] have non-shift register based
    functionality.
    // The other 5 registers continue to behave as shift registers.
    if (no_pixel_shifted_in == 4) begin // for this example 4
    (Number_of_taps –1/2)
        If (EHA == ZERO_BASED) begin
            For (i=0; i<4; i++) P[i] <=0; // zeroing done here
            For (i=4; i<8; i++) P[i] <=P[i+1];
            P[8} < = data_in;
        End
        If (EHA == REPLICATION) begin
            For (i=0; i<4; i++) P[i] <=P[5]; // replication done here
            For (i=4; i<8; i++) P[i] <=P[i+1];
            P[8} < = data_in;
        End
        If (EHA == MIRRORING) begin
            P[0] <= data_in; // mirroring for P[0]
            For (i=1; i<4;; i++) P[i]<=P[9–i]; // mirroring for P[1]
            to P[3]
            For (i=4; i<8; i++) P[i] <=P[i+1];
            P[8] <= data_in;
        End
    End
```

TABLE 1-continued

```
// right edge special code
// this code kicks in for 4 cycles from (e.g.: cycle no. 721 to
724, if input has
    720 lines
// input pixel. The only change is to P[8]. The other 11
registers continue to
    // behave as shift registers.
    if (no_pixel_shifted_in > =line_width) begin
        For (i=0; i<8; i++) P[i] <=P[i+1]; // registers 0 to 7
        if (no_pixel_shifted_in == line_width) begin
            if (EHA ==ZERO_BASED) P[8] < =0;
            if (EHA == REPLICATION) P[8] <=P[8]
            if (EHA == MIRRORING) P[8] <=P[7]]
        end
        if (no_pixel_shifted_in == line_width+2) begin
            if (EHA == ZERO_BASED) P[8] <=0;
            if (EHA == REPLICATION) P[8] <=P[8]
            if (EHA == MIRRORING) P[8] <=P[1];
        end
    End
    // FINAL ELSE clause (simple shift register)
    If   ((edge == none) \\
         ((edge == left) &((pixel_shifted_in !=5) \\
         ((edge == right) &((pixel_shifted_in <
         bundle_width)) begin
             For (i=0; i<8;i++) P[i] <=P[i+1];
             P[8] <=date_in;
    End
End
```

Although FIG. 1 illustrates edge handling logic 100 according to an embodiment for a nine tap polyphase filter for performing a video post-processing operation, it should be recognized the embodiments described herein regarding edge handling logic 100 include and are not limited to various configurations depending on a number of taps, N, of the polyphase filter, as required by the video post-processing operation. Likewise, although illustrated with input MUX 120 and second MUXes 130, additional MUXes may be added as required to accommodate the various edge handling mode to provide input pixels for an output pixel computation.

Hence, in the embodiments described herein, edge handling to generate missing input pixels, occurs during the post-processing operation and not prior to the video post-processing operation as performed by conventional techniques that pad pixels at a periphery of the pixel frame to avoid missing input pixels for output pixel computation at pixel frame edges. For example, as shown in FIG. 2, conventional techniques pad decoded pixel frames with missing pixels prior to post-processing provides of the pixel frames for display.

Figure 3:
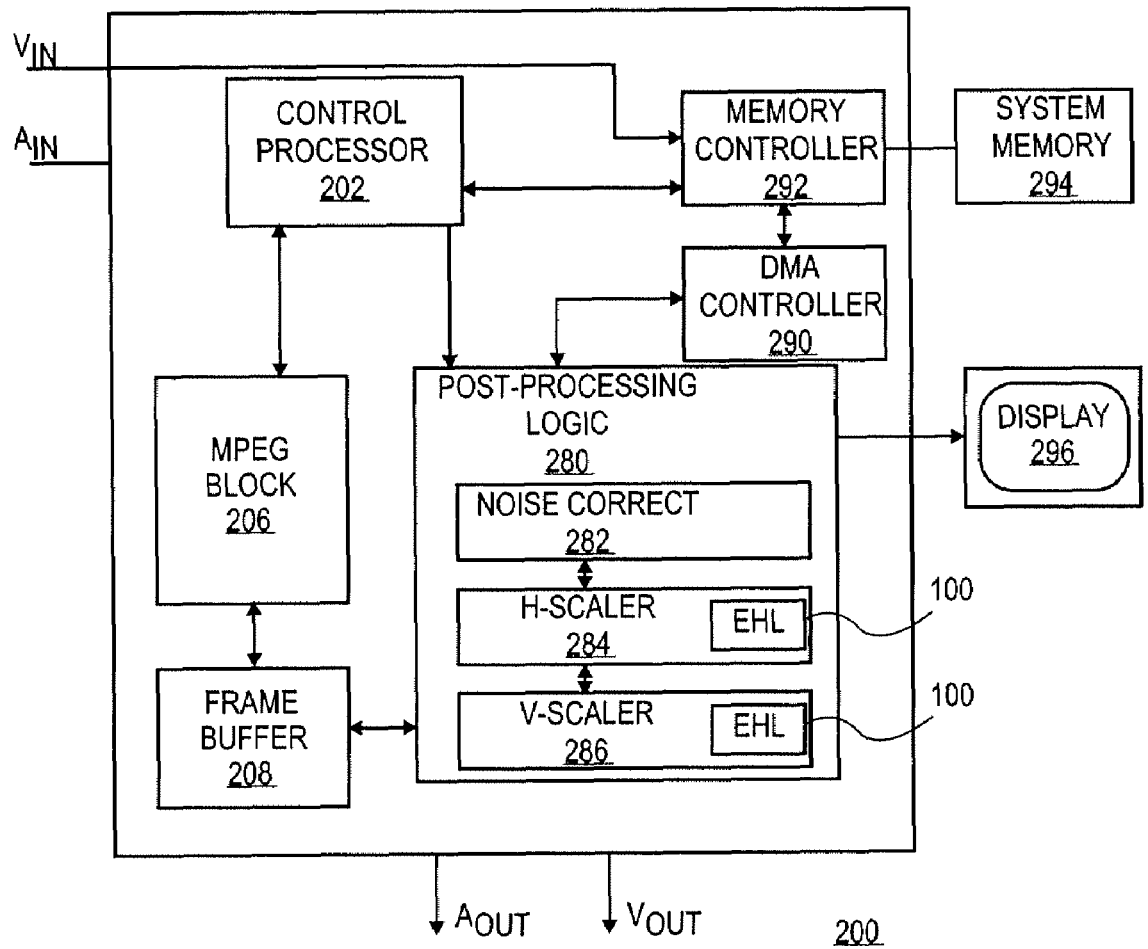
FIG. 3 is a block diagram illustrating a system including edge handling logic, for example, as illustrated with reference to FIG. 1, in accordance with one embodiment.

FIG. 3 is a block diagram illustrating a system on-chip (SOC) 200 including post-processing logic 280 having a horizontal scaler (H-scaler) 284 and a vertical scaler (V-scaler) 286, including edge handling logic (EHL) 100 of FIG. 1. Representatively, system 200 includes embedded control processor 202 coupled to memory controller 292 and DMA controller 290. In one embodiment, post-processing logic 280 may include noise correction block 282, as well as horizontal scale (H-scaler) 284 and vertical scaler (V-scaler) 286. In one embodiment, motion picture experts group (MPEG) block 206 provides decoded digital video frames to frame buffer 208 for post-processing logic 280, which may perform, for example, scaling or image enhancement of received decoded digital video frames. In one embodiment, MPEG block 206 generates the decoded video frames from an encoded video signal received from external system memory 294.

In one embodiment, post-processing logic 280 relies on control processor 202 or software pre-setup to determine the edge handling mode and the line width of the current pixel frame line. In one embodiment, control processor 202 is an embedded processor, which may be programmed with assembly language code. In an alternate embodiment, device drivers may be provided to either assist control processor 202 to populate EHM register 116 and line width register 118 to direct controller 110 to populate input pixel registers 140 to enable, for example, an anamorphic scaling operation. Once the post-processing is performed, the output pixel frames are provided to display 296. In the embodiments described, display 296 may be an analog cathode ray tube (CRT) monitor, a digital monitor, such as a flat panel display with a digital display interface, a DTV unit or the like.

In one embodiment, to provide, for example, compliance with a 30 frame per second bandwidth requirement of post-processing logic 280, on-chip direct memory access (DMA) controller 290 issues DMA requests to on-chip memory controller 292, which provides pixel frames from off-chip system memory 294 to DMA controller 290. The pixel frames are then provided to frame buffer 208, such as a first-in, first-out (FIFO) buffer, or the like. In one embodiment, such initial frames may be provided to MPEG block 206, which decodes the received frames into decoded digital video signal frames and provide such frames to post-processing logic 280 via frame buffer 208.

In one embodiment, system 200 may be incorporated within a set-top box or television to provide high definition television (HDTV) signal processing, as well as within a display pipeline of a DTV or the like. In such an embodiment, system memory 294 is provided by the set-top box or the television system. However, it should be recognized that SOC 200 may be provided within other systems that provide display of image or video signal, e.g., a home personal computer (PC), a desktop or notebook unit, handheld device, or the like.

In one embodiment, SOC 200 may be implemented within, for example, a display engine of a graphics controller or chipset of a computer system or display device requiring post-processing or image enhancement prior to display of a decoded image or video frames, which may require edge handling at pixel frame boundaries. In doing so, SOC 200 avoids limitations of prior art techniques, which pattern an outer perimeter of the pixel frame buffer according to an edge handling mode, which requires additional overhead and date storage within memory. Methods for implementing one or more embodiments are now described.

Operation

Figure 4:
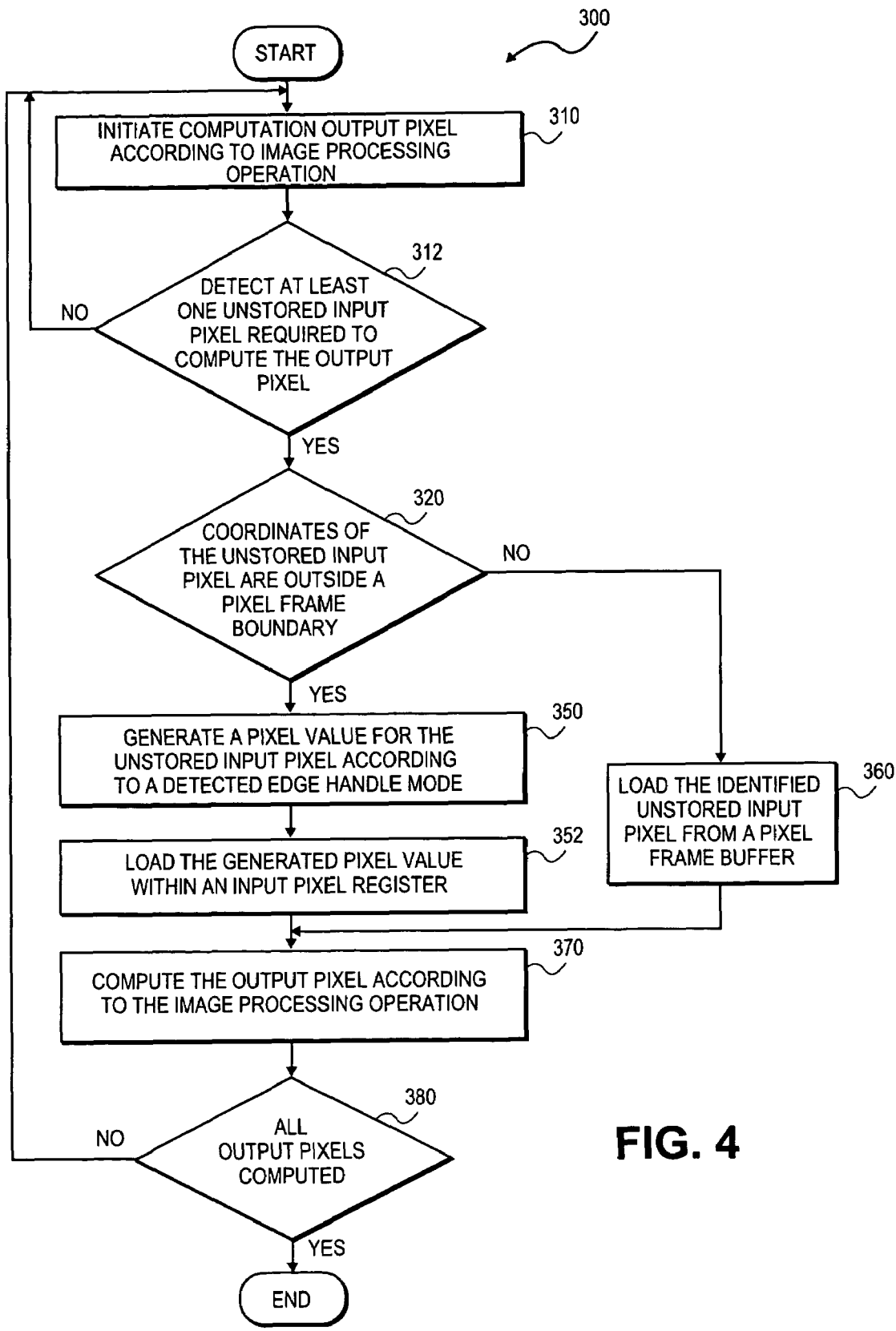
FIG. 4 is a flowchart illustrating a method for edge handling in image processing, in accordance with one embodiment.

FIG. 4 is a flowchart illustrating a method 300 for hardware-based edge handling for video post-processing and/or image enhancement, in accordance with one embodiment. At process block 310, computation of an output pixel is initiated according to a video post-processing and/or image enhancement operation. At process block 312, it is determined whether at least one input pixel required to compute the output pixel is unstored within an input pixel register. When such is detected, at process block 320, it is determined whether the unstored input pixel is outside a pixel frame boundary.

In one embodiment, at process block 350, a pixel value is generated for the unstored input pixel according to a detected edge handling mode. In one embodiment, the generation of the input pixel is performed by a controller, for example, controller 110 of edge handling logic 100 of FIG. 1. Once the pixel value is generated, the pixel value is loaded within the input pixel register. If multiple input pixels required to compute the output pixel are unstored and outside a pixel frame boundary, process blocks 350 and 352 may be repeated until a number, N, of input pixels required to compute the output pixel are stored. Otherwise, at process block 360, the unstored input pixel is loaded within an input pixel register from a pixel frame buffer. At process block 370, the output pixel is computed. At process block 380, process blocks 310-360 are repeated until all output pixels are computed.

Figure 5:
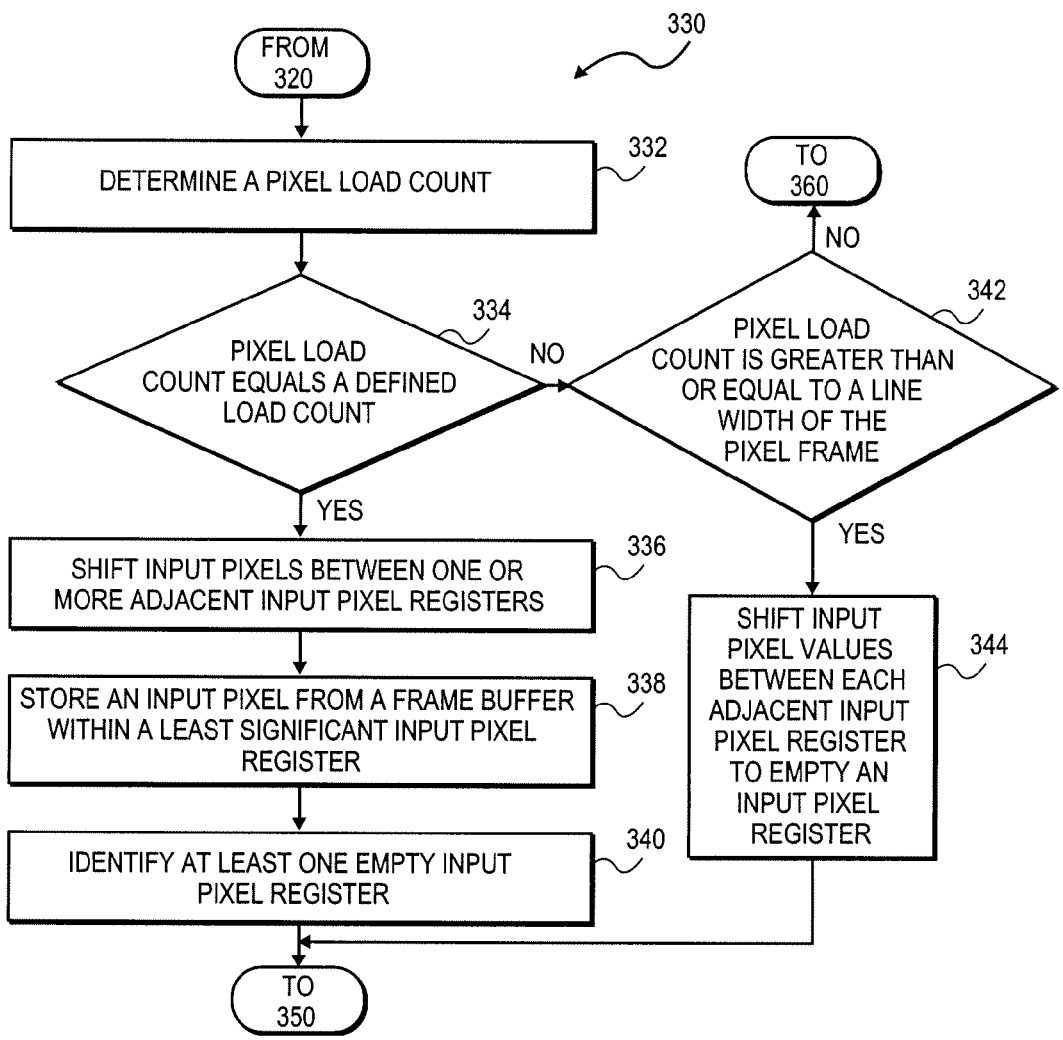
FIG. 5 is a flowchart illustrating a method for edge handling at pixel frame boundaries, in accordance with one embodiment.

FIG. 5 is a flowchart illustrating a method 330 for hardware-based edge handling within a video scaler, for example, as illustrated with reference to FIG. 3. At process block 332, a pixel load count is determined. In one embodiment, a pixel load count is tracked according to a line width register, such as, for example, line width register 118 of edge handling logic 100 of FIG. 1. At process block 334, a left pixel frame edge is detected if the pixel load count equals a defined load count. In one embodiment, the defined load count is determined according to Equations (1) and (2). Accordingly, in the embodiment described with reference to FIG. 2, the defined pixel mode count is equal to four.

When a condition of process block 334 evaluates to true, at process block 336, input pixels between one or more adjacent input pixel registers are shifted. At process block 338, an input pixel from a pixel frame buffer is stored within a least significant input pixel register, such as, for example, input pixel register 140-1 of FIG. 1. Once loaded, at process block 340, at least one empty input pixel register is identified. The identification of the input pixel register is provided to load values generated for missing input pixels outside a pixel frame boundary to compute the output pixel according to the video post-processing or image enhancement operation.

At process block 342, it is determined whether a pixel load count is greater than or equal to a line width of a current pixel frame line. When such condition evaluates to true, at process block 344, input pixel values between each adjacent input pixel register are shifted to empty an input pixel register. The shifting of the input pixel registers empties an input pixel register to load at least one value generated for an input pixel outside a right pixel frame edge. Subsequently, control flow branches to process block 350 of FIG. 4. Otherwise, control flow branches to process block 360, such that each input pixel required to compute an output pixel is contained within either an input pixel register or a pixel frame buffer.

In one embodiment, the identification of an unstored input pixel is performed by determining the input pixels required to compute an output pixel. Once determined, in one embodiment, controller 110 of FIG. 1 may determine whether any of the input pixels required to compute the output pixel are unstored within an input pixel register. When such is the case, at least one unstored input pixel register required to compute an output pixel is detected. Subsequently, if the unstored input pixels are outside a pixel frame boundary, the controller may generate pixel values according to a detected edge handling mode rather than using conventional techniques, which pad input pixels outside pixel frame boundaries, prior to the video post-processing operation, to provide edge handling.

Figure 6:
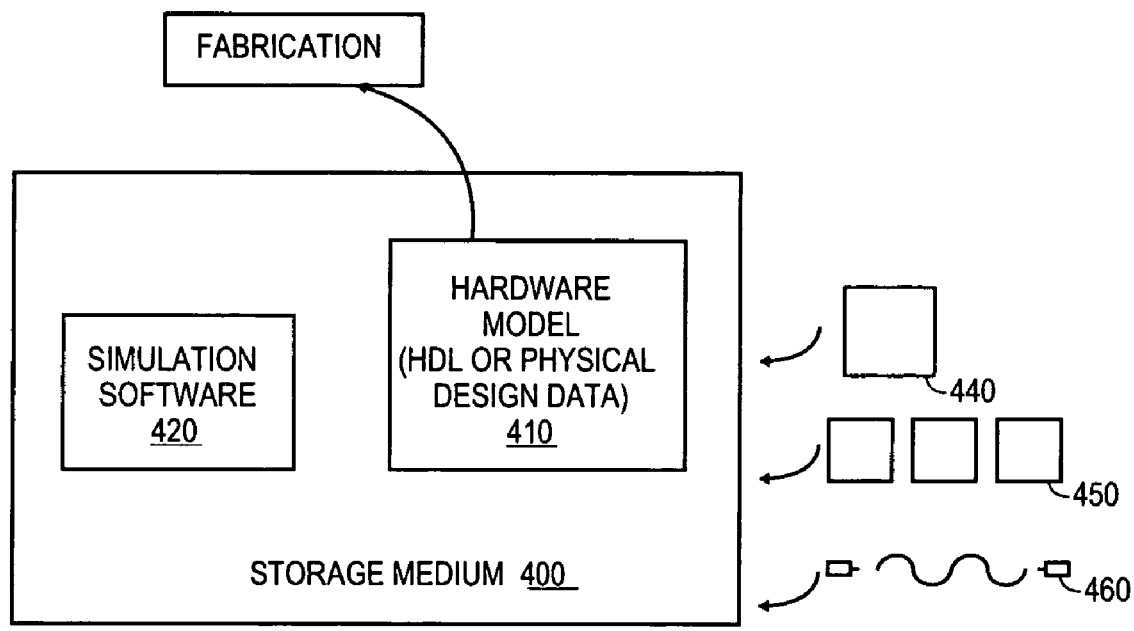
FIG. 6 is a block diagram illustrating various design representations for formats for emulation, simulation and fabrication of a design using the disclosed techniques.

FIG. 6 is a block diagram illustrating various representations or formats for simulation, emulation and fabrication of a design using the disclosed techniques. Data representing a design may represent the design in a number of manners. First, as is useful in simulations, the hardware may be represented using a hardware description language, or another functional description language, which essentially provides a computerized model of how the designed hardware is expected to perform. The hardware model 410 may be stored in a storage medium 400, such as a computer memory, so that the model may be simulated using simulation software 420 that applies a particular test suite to the hardware model 410 to determine if it indeed functions as intended. In some embodiments, the simulation software is not recorded, captured or contained in the medium.

In any representation of the design, the data may be stored in any form of a machine readable medium including a machine readable transmission medium and a machine readable storage medium. A machine readable transmission medium may include an optical or electrical wave 460 modulated or otherwise generated to transport such information. A memory 450 or a magnetic or optical storage 440, such as a disk, may be the machine readable storage medium. Any of these mediums may carry the design information. The term "carry"(e.g., a machine readable transmission medium carrying information) thus covers information encoded or modulated into or onto a carrier wave. The set of bits describing the design or a particular of the design are (when embodied in a machine readable medium, such as a storage medium) an article that may be sealed in and out of itself, or used by others for further design or fabrication.

ALTERNATIVE EMBODIMENTS

It will be appreciated that, for other embodiments, a different system configuration may be used. For example, while the system 200 is configured as a system-on-chip, for other embodiments, a single or multiprocessor system (where one or more processors may be similar in configuration and operation to the processor 202 described above) may benefit from the hardware-based edge handling of various embodiments. Further, a different type of system or different type of computer system such as, for example, a server, a workstation, a desktop computer system, a gaming system, an embedded computer system, a blade server, etc., may be used for other embodiments.

Having disclosed embodiments and the best mode, modifications and variations may be made to the disclosed embodiments while remaining within the scope of the embodiments of the invention as defined by the following claims.

What is claimed is:

1. A method comprising:
using a system on-chip to perform:
identifying, during output pixel computation, at least one unstored input pixel required to compute an output pixel; and then
generating a pixel value for the identified unstored input pixel according to a detected edge handling mode of a plurality of programmable, edge handling modes, if coordinates of the unstored input pixel are outside a pixel frame boundary.

2. The method of claim 1, further comprising:
loading the generated pixel value within an input pixel register to store N input pixels required to compute the output pixel, where N is an integer.

3. The method of claim 1, further comprising:
loading the identified unstored input pixel from a pixel frame buffer if the coordinates of the unstored pixel are within the pixel frame boundaries.

4. The method of claim 1, wherein generating further comprises:
accessing a mode register to identify an edge handling mode as one of a zero-based edge handling mode, a replication edge handling mode and a mirroring edge handling mode; and
forming the pixel value according to the identified edge handling mode.

5. The method of claim 1, wherein generating further comprises:
determining a pixel load count;

detecting a left pixel frame edge if the pixel load count equals a defined load count; and detecting a right pixel frame edge if the pixel load count is greater than or equal to a line width of the pixel frame.

6. The method of claim 5, wherein detecting the left pixel frame edge further comprises:

shifting input pixels between one or more adjacent input pixel registers;

storing an input pixel from a frame buffer within a least significant input pixel register;

identifying at least one empty input pixel register; and loading the empty input pixel register within the pixel value generated according to the detected edge handling mode.

7. The method of claim 1, wherein detecting the right pixel frame edge further comprises:

shifting input pixel values between each adjacent input pixel registers to empty an input pixel register; and loading the empty input pixel register with the pixel value generated according to the detected edge handling mode.

8. The method of claim 1, wherein the output pixel computation comprises a video scaling operation.

9. The method of claim 1, wherein identifying comprises:

determining N input pixels required to compute the output pixel; and detecting the at least one unstored input pixel if at least one of the N input pixels required to compute the output pixel is not contained within an input pixel register of N input pixel registers, where N is an integer.

10. The method of claim 5, wherein detecting the right pixel frame edge further comprises:

accessing a line width register to determine the line width of the pixel frame.

11. An article of manufacture comprising a machine readable storage medium having stored thereon instructions that program a system to:

detect, during computation of an output pixel, one or more input pixels required to compute the output pixel, the detected input pixels each having coordinates of outside a pixel frame boundary;

generate a pixel value for each detected unstored input pixel according to a detected edge handling mode of a plurality of programmable, edge handling modes; and compute the output pixel according to an image processing operation.

12. The article of manufacture of claim 11, wherein the system is further programmed to:

load one or more identified unstored input pixels required to compute the output pixel from a pixel frame buffer if the coordinates of the identified unstored pixels are within the pixel frame boundaries; and load each generated pixel value within an input pixel register to store N, input pixels required to compute the output pixel, where N is an integer.

13. The article of manufacture of claim 11, wherein to generate the pixel value, the system is further programmed to:

determine a pixel load count;

detect a left pixel frame edge if the pixel load count equals a defined load count; and detect a right pixel frame edge if the pixel load count is greater than or equal to a line width of the pixel frame.

14. The article of manufacture of claim 13, wherein to detect the left pixel frame edge, the system is further programmed to:

shift input pixels between one or more adjacent input pixel registers;

store an input pixel from a frame buffer within a least significant input pixel register;

identify at least one empty input pixel register; and load the empty input pixel register with a pixel value generated according to the detected edge handling mode.

15. The article of manufacture of claim 13, wherein to detect the right pixel frame edge, the system is further programmed to:

shift input pixel values between each adjacent input pixel register to empty an input pixel register; and load the empty input pixel register with a pixel value generated according to the detected edge handling mode.

16. An apparatus comprising:

a plurality of input pixel registers; and a controller coupled to the plurality of input pixel registers, the controller to identify, during output pixel computation, at least one unstored input pixel within the plurality of input pixel registers required to compute an output pixel and to generate a pixel value for the unstored input pixel according to a detected edge handling mode of a plurality of programmable, edge handling modes, if coordinates of the unstored pixel are outside a pixel frame boundary.

17. The apparatus of claim 16, further comprising:

an edge handling mode register to identify an edge handling mode for generating a pixel value for input pixels having coordinates outside a pixel frame boundary as one of a zero-based edge handling mode, a replication edge handling mode and a mirroring edge handling mode.

18. The apparatus of claim 16, further comprising:

a line width register, the line width register to store a line width of the pixel frame and a pixel load count.

19. The apparatus of claim 16, further comprising:

a first logic gate to receive a control signal from the controller and to populate the first input pixel register with the generated pixel value when a right edge is detected and otherwise to load the first input pixel register with an input pixel value fetched from the pixel frame according to the control signal.

20. The apparatus of claim 19, wherein the first logic gate is to load the first input pixel register following a shift of pixel values between each adjacent input pixel register to empty the first input pixel register.

21. The apparatus of claim 19, further comprising:

one or more second logic gates coupled to one or more of the plurality of input pixel registers, the one or more second logic gates to receive a control signal from the controller to load values within the input pixel registers when a left edge is detected and otherwise to shift values between adjacent input pixel registers.

22. The apparatus of claim 17, wherein a device driver loads the edge handling mode register and the line width register.

23. The apparatus of claim 21, wherein the first logic gate is a multiplexer and the one or more second logic gates are multiplexers, the first multiplexer and the second multiplexers to select an input according to one of a right edge control signal received from the controller and a left edge control signal received from the controller.

24. The apparatus of claim 16, wherein the controller is to generate a control signal to load the generated pixel value within an input pixel register when one of a left edge and a right edge of input pixel frame is detected.

25. The apparatus of claim 16, further comprising:

a control processor to load the edge handling mode register and the line width register.

26. A system comprising:
an embedded processor;
a post-processing logic coupled to the processor, the post-processing logic including a scaler comprising:
a plurality of input pixel registers, and
a controller to identify, during output pixel computation, at least one input pixel unstored within an input pixel register and required to compute an output pixel, and to generate a pixel value for the unstored input pixel according to a detected edge handling mode of a plurality of programmable, edge handling modes, if coordinates of the unstored input pixel are outside a pixel frame boundary; and
a display device to display post-processed video frames.

27. The system of claim 26, further comprising:
a direct memory access (DMA) buffer coupled to the display cluster; and
a DMA controller coupled to the DMA buffer to issue a request to a memory controller to load the DMA buffer with input pixels from system memory.

28. The system of claim 26, wherein the system comprises a system on-chip.

29. The system of claim 26, wherein the system further comprises:
a video decoder to decode digital video from off-chip system memory and to provide decoded digital video frames to the video post processing logic.

30. The system of claim 26, wherein the embedded processor is to load the edge handling mode register and the line width register.

31. A method comprising:
using a system on-chip to perform:
identifying, during output pixel computation, at least one unstored input pixel required to compute an output pixel; and then
generating a pixel value for the identified unstored input pixel according to a detected edge handling mode, if coordinates of the unstored input pixel are outside a pixel frame boundary;
detecting a left pixel frame edge if a determined pixel load count equals a defined load count; and
detecting a right pixel frame edge if the determined pixel load count is greater than or equal to a line width of the pixel frame.

* * * * *